US005826113A

United States Patent [19]
Nonaka

[11] Patent Number: 5,826,113
[45] Date of Patent: Oct. 20, 1998

[54] AUTO-FOCUSING CAMERA CAPABLE OF PHOTOGRAPHING IN WATER

[75] Inventor: Osamu Nonaka, Sagamihara, Japan

[73] Assignee: Olympus Optical Co., Ltd., Tokyo, Japan

[21] Appl. No.: 554,550

[22] Filed: Nov. 6, 1995

[30] Foreign Application Priority Data

Nov. 14, 1994 [JP] Japan ................................... 6-279401
Jan. 12, 1995 [JP] Japan ................................... 7-003473

[51] Int. Cl.⁶ .................................................. G03B 17/08
[52] U.S. Cl. ................................. 396/25; 376/28; 376/29
[58] Field of Search ............................. 354/64, 126, 400, 354/430; 348/81; 250/903, 900, 573, 574, 577; 356/436, 442

[56] References Cited

U.S. PATENT DOCUMENTS

| | | |
|---|---|---|
| 3,571,649 | 3/1971 | Bush, Jr. . |
| 3,882,887 | 5/1975 | Rekai ........................................ 137/386 |
| 3,936,187 | 2/1976 | Momose . |
| 4,357,083 | 11/1982 | Johnson et al. . |
| 4,415,245 | 11/1983 | Harvey . |
| 4,470,680 | 9/1984 | Inagaki ...................................... 354/402 |
| 4,514,084 | 4/1985 | Makino et al. . |
| 4,634,253 | 1/1987 | Tamamura ................................. 354/403 |
| 4,653,883 | 3/1987 | Maeno . |
| 4,697,897 | 10/1987 | Tamamura . |
| 4,707,094 | 11/1987 | Tusting ...................................... 354/64 |
| 4,785,322 | 11/1988 | Harrison et al. . |
| 4,876,565 | 10/1989 | Tusting ...................................... 354/403 |
| 4,898,462 | 2/1990 | Numata et al. ............................. 356/70 |
| 4,999,664 | 3/1991 | Foust . |
| 5,111,222 | 5/1992 | Hayakawa et al. . |
| 5,438,363 | 8/1995 | Ejima et al. ............................... 348/223 |
| 5,459,568 | 10/1995 | Yano et al. ................................ 356/336 |
| 5,513,622 | 5/1996 | Hayakawa et al. . |
| 5,534,708 | 7/1996 | Ellinger et al. ........................... 250/577 |

FOREIGN PATENT DOCUMENTS

| | | |
|---|---|---|
| 57-144409 | 9/1982 | Japan . |
| 59-53819 | 3/1984 | Japan . |
| 59-131919 | 7/1984 | Japan . |
| 59-131921 | 7/1984 | Japan . |
| 60-61732 | 4/1985 | Japan . |
| 60-98836 | 7/1985 | Japan . |
| 61-295533 | 12/1986 | Japan . |
| 63-266410 | 11/1988 | Japan . |
| 3-31721 | 3/1991 | Japan . |
| 4-170532 | 6/1992 | Japan . |
| 5-8596 | 3/1993 | Japan . |

*Primary Examiner*—Safet Metjahic
*Assistant Examiner*—Eric Nelson
*Attorney, Agent, or Firm*—Frishauf, Holtz, Goodman, Langer & Chick

[57] ABSTRACT

An AF section receives a reflected light beam from the subject. A CPU calculates a distance to the subject based on an output of the AF section. An underwater detecting section optically determines that the camera lies in the water. A transparency detecting section evaluates the degree of muddiness of the surrounding water when the camera lies in the water. A focusing section sets the focusing position of the photographing lens of the camera based on an output of the CPU and an output of the transparency detecting section when the underwater detecting section has determined that the camera lies in the water.

34 Claims, 9 Drawing Sheets

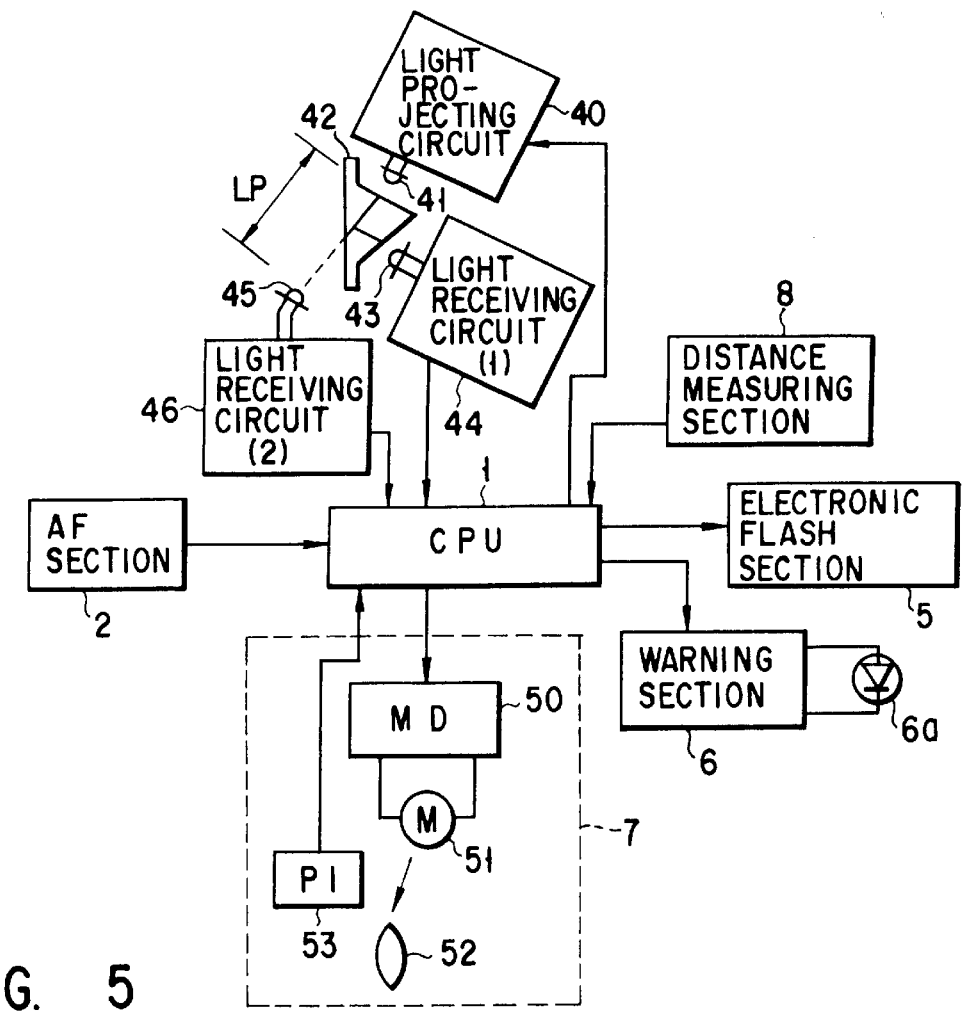
F I G. 5
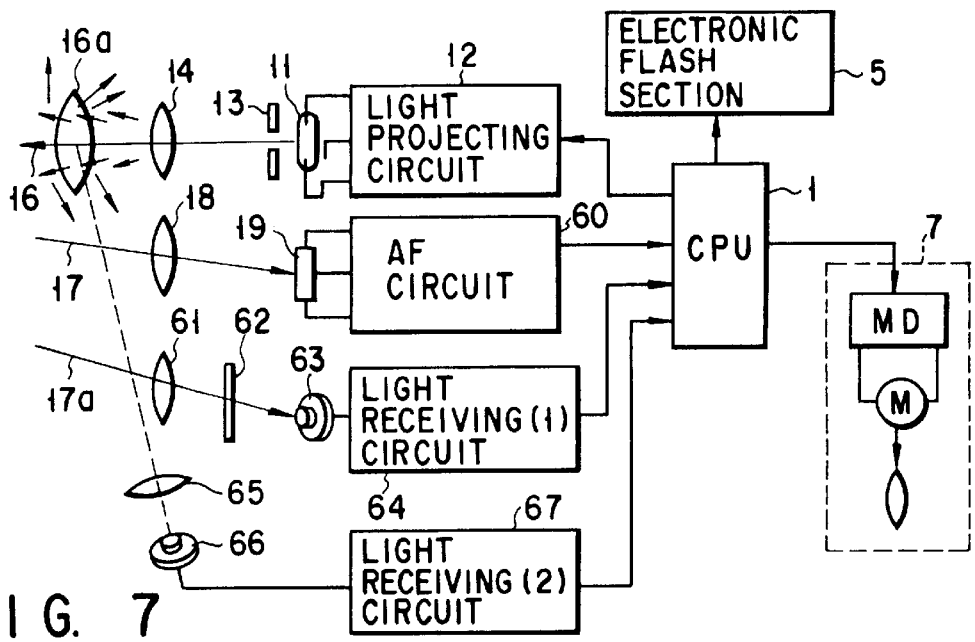
F I G. 7

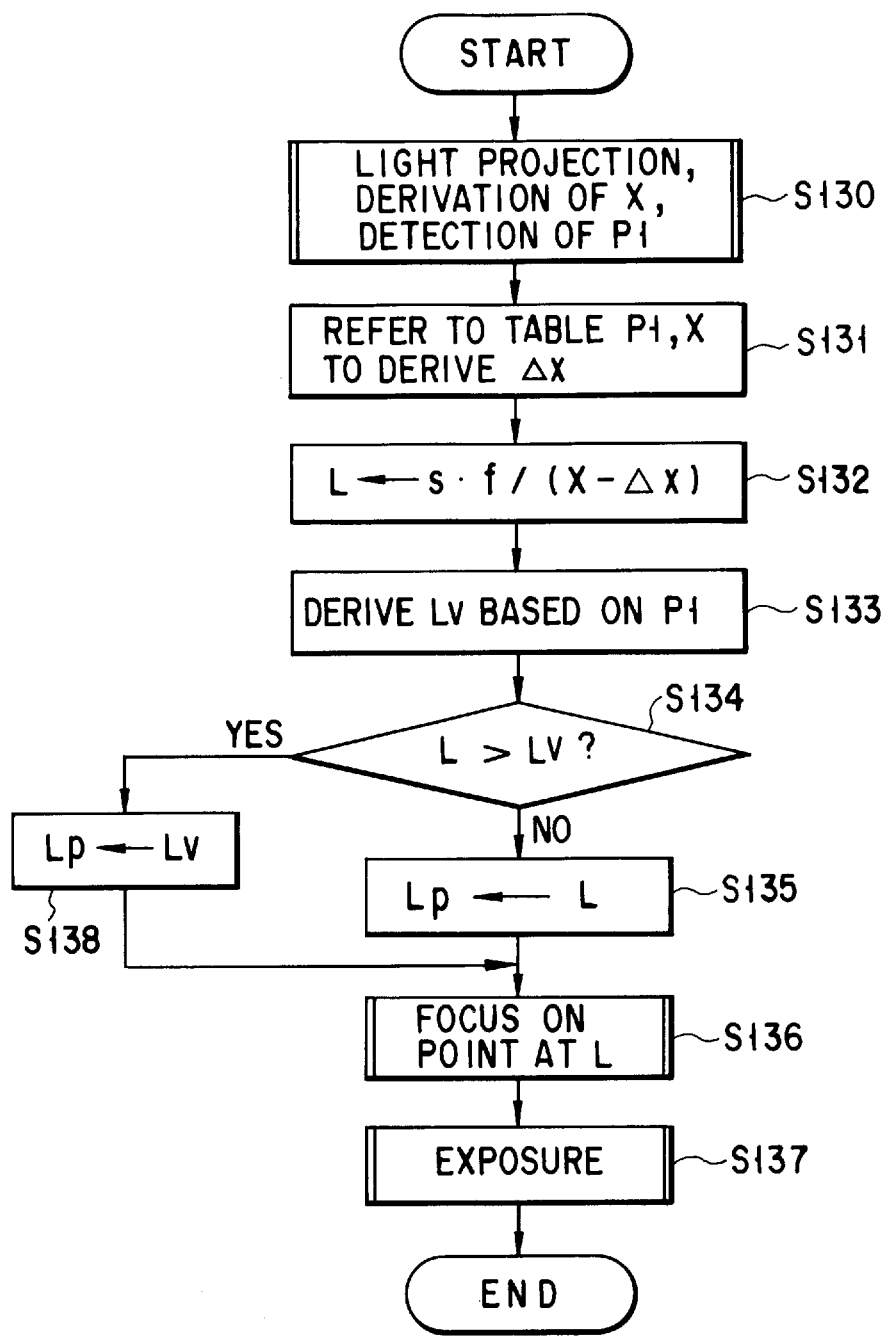
F I G. 12

AUTO-FOCUSING CAMERA CAPABLE OF PHOTOGRAPHING IN WATER

BACKGROUND OF THE INVENTION

1. Field of the Invention

The present invention generally relates to a camera and, more particularly, to a camera capable of photographing in water and taking photographs with auto-focus in the water or in the air.

2. Description of the Related Art

Recently, as the outdoor leisure is widely popularized, the number of people having a hobby of diving increases and the number of people who enjoy themselves by photographing fish and coral in the water increases. However, most of the normal cameras only are water proof for daily use, and even if they can be used in the water, most of them cannot attain auto-focusing (automatic focusing function which is hereinafter referred to as AF) because of the transparency of the water.

For example, according to Jpn. Pat. Appln. KOKAI Publication No. 61-295533, a method of taking photographs in the air in exactly the same manner as in the normal AF camera and taking photographs with the fixed focus in the water by forming the first surface of the photographing optical system of a camera in a convex form and preventing the normals of two windows for distance measurement from being set in the same position and crossing each other is proposed.

Further, according to Jpn. Pat. Appln. KOKAI Publication No. 59-53819, a method is proposed in which the focusing control member is designed to automatically effect the focusing for a desired subject based on one of first and second signals for lens position controlling used for focusing the photographing lens on a point at a preset distance and one of the above focusing operations is selected by a detection signal from the detection member for automatically detecting that the camera is in the water or in the air so that the focus adjustment can be attained according to the second signal in the case of photographing in the water and the first signal in the case of photographing in the air.

However, in the method described in Jpn. Pat. Appln. KOKAI Publication No. 61-295533, even if divers lying at a relatively long distance may be photographed in a focused condition, small fish and the like moving near the camera will be photographed in an out-of-focus condition.

Further, in the method described in Jpn. Pat. Appln. KOKAI Publication No. 59-53819, even if it is detected that the camera is used in the water, good photographs cannot be taken in many cases since the transparency of water is not taken into consideration and the camera takes photographs in the same manner in the water having a low degree of transparency, that is, in the muddy water and in the water having a high degree of transparency. For example, in the water having a high degree of transparency, the photographing which is almost the same as that in the air can be attained as shown in FIG. 4A. However, in the sea in which dust on the sea bottom flies up or a large amount of plankton is present, the light from the electronic flash section is reflected from particles of the dust and plankton drifting in the water. For this reason, the whole portion of the picture becomes whitish as shown in FIG. 4B and good photographs cannot be taken in many cases.

Further, even when the auto-focusing is used, the distance cannot be precisely measured by the same method as that used in the photographing in the air and the main subject may be photographed in an out-of-focus condition.

SUMMARY OF THE INVENTION

It is, therefore, an object of the present invention to provide a new and improved auto-focusing camera capable of photographing in water which can easily take photographs in the water by precisely effecting the auto-focusing not only in the air but also in the water.

According to an aspect of the present invention, there is provided an auto-focusing camera capable of photographing in water, comprising underwater state detecting means for detecting or setting a condition in which the medium around the camera is water; focus detecting means for optically detecting data necessary for the focus adjustment of the photographing lens; transparency evaluating means for optically detecting the degree of transparency of the medium around the camera; and lens driving means for adjusting the focus of the photographing lens based on an output of the focus detecting means, output of the underwater state detecting means and output of the transparency evaluating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a diagram showing the constructions of an underwater detecting section 4 and transparency detecting section 3 shown in the first embodiment of FIG. 1;

FIG. 7 is a diagram showing the constructions of the modifications of the underwater detecting section 4 and transparency detecting section 3 of the first embodiment;

FIG. 12 is a flowchart for illustrating the process of a CPU 1 as the operation of the camera capable of photographing in water according to the second embodiment;

DETAILED DESCRIPTION OF THE PREFERRED EMBODIMENTS

Figure 1:
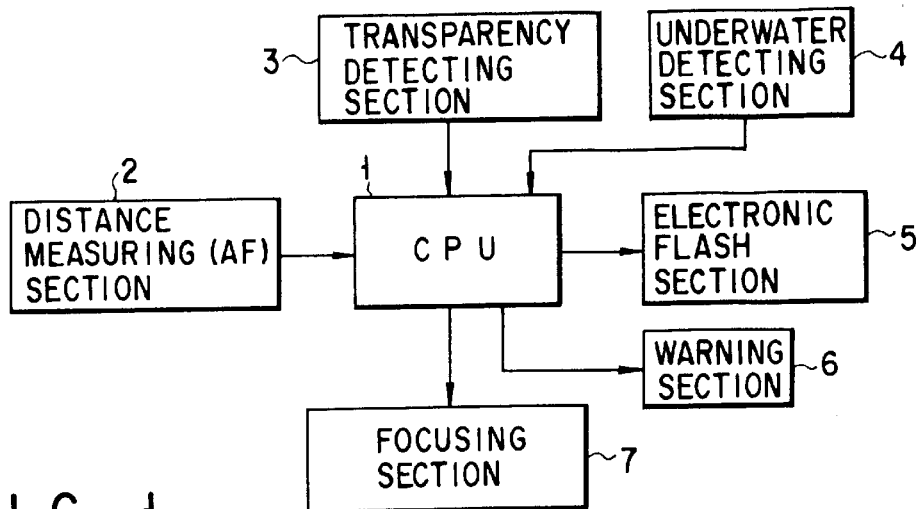
FIG. 1 is a diagram showing the schematic construction of a camera capable of photographing in water commonly used in each of the embodiments of the invention.

Reference will now be made in detail to the presently preferred embodiments of the invention as illustrated in the accompanying drawings, in which like reference characters designate like or corresponding parts throughout the several drawings.

There will now be described embodiments of this invention with reference to the accompanying drawings.

FIG. 1 is a diagram showing the schematic construction of a camera capable of photographing in water commonly used in each of the embodiments of the invention.

In FIG. 1, to an operation controlling section (which is hereinafter referred to as a CPU) 1 such as a one-chip microcomputer, a distance measuring section (AF section) 2 for measuring the distance to the subject, a transparency detecting section 3 for detecting the degree of transparency in the water, an underwater detecting section 4 for detecting whether the camera is used in the water or in the air, an electronic flash section 5 for additionally emitting light when the subject is put in a dark condition, a warning section 6 for giving a warning to the photographer, and a focusing section 7 for moving the focusing lens and controlling the position thereof according to an output of the distance measuring section 2 are connected.

The CPU 1 controls the operation sequence of the above parts and processes output signals from the transparency detecting section 3, underwater detecting section 4 and distance measuring section 2 so as to control the amount of light emitted from the electronic flash section by the electronic flash section 5 and the position of the focusing lens by the focusing section 7.

Next, the camera capable of photographing in water of the first embodiment according to this invention is explained.

Figure 2:
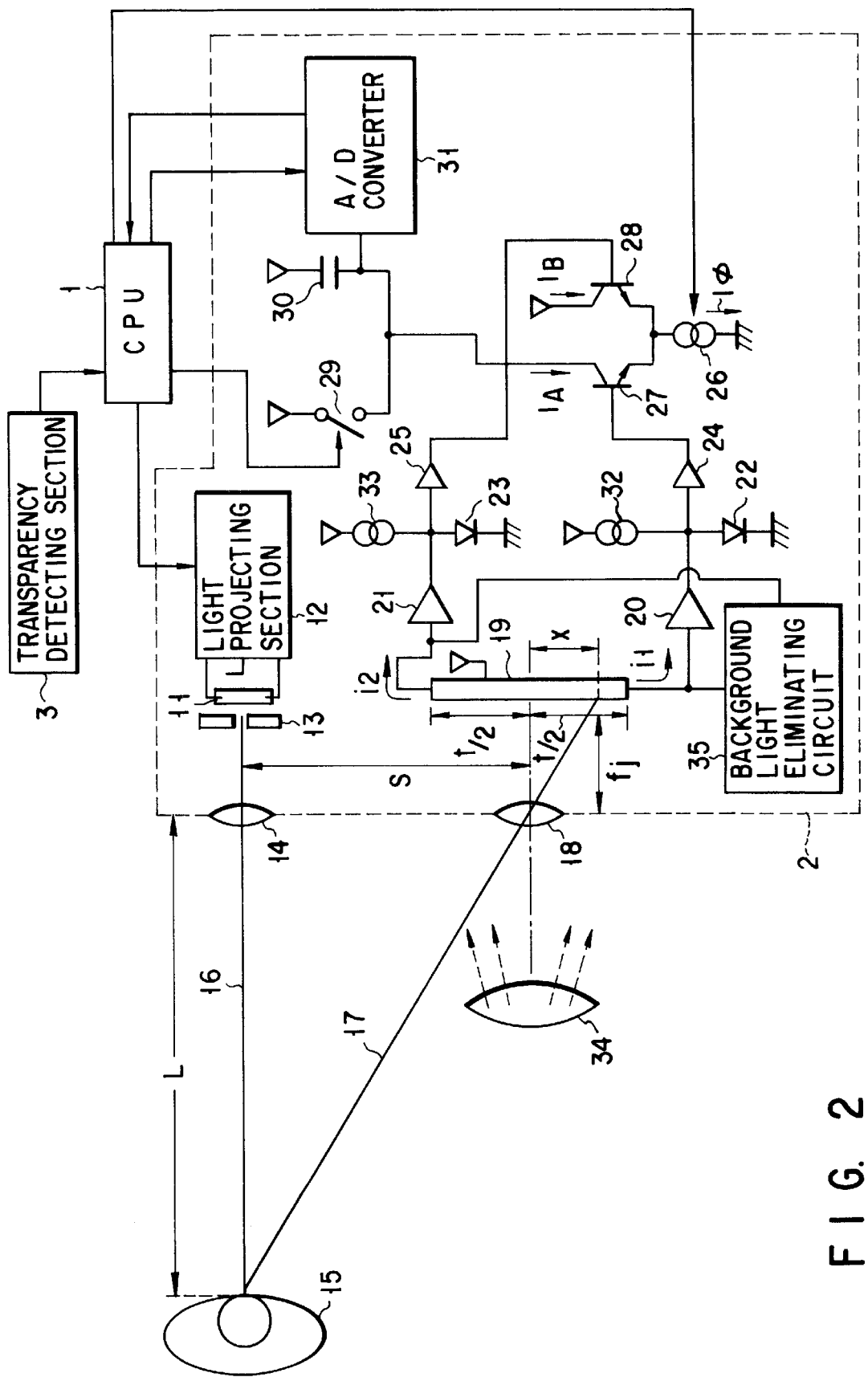
FIG. 2 is a diagram showing the construction of a distance measuring section 2 shown in the first embodiment of FIG. 1.

FIG. 2 is a diagram showing the construction of the distance measuring section 2 of the first embodiment shown in FIG. 1.

In this case, the reason why the distance measurement in the water having a low degree of transparency is difficult is explained. The CPU 1 drives a light projecting source 11 via a light projection circuit 12 to emit light. If an infrared emitting diode (IRED) is used as the light projecting source 11, it is totally impossible to detect reflection signal light because of the wavelength dependency of the light absorption of the water. Therefore, in this example, a xenon discharge tube (which is hereinafter referred to as a Xe tube) capable of projecting visible light which is relatively less influenced by the absorption is used. A mask 13 having a gap like a small spot and a projection lens 14 are arranged in front of the light projecting source 11 to converge and project sharp light towards the subject 15.

In the transparent water or in the air, projected light 16 for distance measurement is reflected from the subject 15 and made incident on a semiconductor optical position detecting element (which is hereinafter referred to as PSD) 19 via a light receiving lens 18 as reflected signal light 17. The PSD 19 outputs two current signals i1 and i2 caused by the photovoltaic effect and the carrier dividing effect caused by the surface resistance layer.

The following relation can be obtained between the current signals i1 and i2.

$$i1/(i1+i2) = (\tfrac{1}{2}) + (x/t) \tag{1}$$

t in the equation (1) indicates the length of the PSD 19 in the detection direction and x indicates the light incident position of the reflected signal light 17 on the PSD.

On the other hand, the following relation is set between the light incident position x, the distance S between the principal points of the light projecting lens 14 and the light receiving lens 18, the focal distance fj of the light receiving lens 18 and the distance L to the subject.

$$(x) = (S \cdot fj)/L \tag{2}$$

The following equation can be derived from the equations (1) and (2).

$$\begin{aligned}1/L &= x/(S \cdot fj) \\ &= t/(S \cdot fj) \times \{i1/(i1 + i2) - 1/2\}\end{aligned} \tag{3}$$

Since t, S and fj are fixed values, the reciprocal 1/L of the distance L to the subject can be derived by calculating the ratio of the current signals i1 and i2 in the equation (3).

Generally, the extension amount of the focusing lens (photographing lens) for focusing of the camera varies with 1/L. Thus, the following equation can be attained by rewriting the equation (3) and setting the current signal of the distance measuring section 2 to a distance measurement output AD.

$$AD = i1/(i1+i2) = C \cdot 1/L + \tfrac{1}{2} \tag{4}$$

In this case, C can be expressed as $C = S \cdot fj/t$.

The circuit for deriving the current signals i1 and i2 in the form of i1/(i1+i2) in an analog manner is constructed by preamplifiers 20, 21 and the succeeding-stage circuit shown in FIG. 2. The current signals i1, i2 output from the PSD 19 are respectively amplified by the preamplifiers 20, 21 and then supplied to respective compression diodes 22, 23. Output voltages of the compression diodes 22, 23 are input to the bases of two NPN transistors 27, 28 constructed in a differential form together with a constant current source 26 via respective buffer circuits 24, 25.

The following relations can be attained by setting the constant current value of the constant current source 26 to Iφ and setting currents flowing in the collectors of the NPN transistors 27, 28 to IA, IB.

$$IA + IB = I\phi \tag{5}$$

$$i1/i2 = IA/IB \tag{6}$$

Then, the following equation can be obtained.

$$IA=\{i1/(i1+i2)\}\cdot I\phi \quad (7)$$

Before light emission from the Xe tube is used as the light projecting source 11, a switch 29 is turned ON to set the potential difference between two ends of an integrating capacitor 30 to 0. Then, if the constant current I$\phi$ is caused to flow in a preset period of time from the same time as light emission of the Xe tube after the switch 29 is turned OFF, a voltage varying in proportion to the value expressed by the equation (7) is generated on the integrating capacitor 30.

Therefore, if the CPU 1 receives the above voltage via an analog/digital converter (A/D converter) 31 and calculates the same, a distance measurement output expressed in the equation (4) can be obtained. However, if the subject lies at a far distance, the current signals i1, i2 become small and the S/N ratio is deteriorated since the reflected light signal 17 becomes small. Therefore, small current sources 32, 33 are used so as to cause small currents to flow in the compression diodes 22, 23.

Figure 3A:
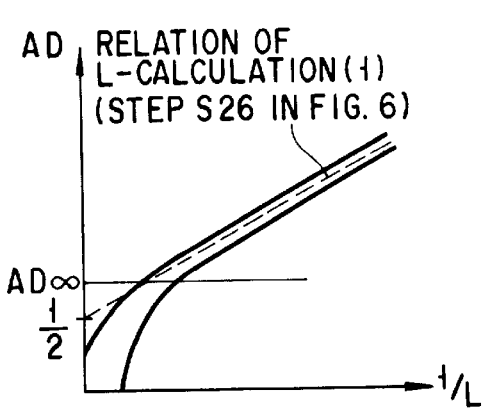
FIGS. 3A and 3B are diagrams showing the distance measuring characteristics for the measurements in the air and in the water.

By the above device, the relation between the distance measurement output AD and 1/L as shown in FIG. 3A can be obtained. Broken lines in FIG. 3A indicate the relation expressed by the equation (4), but in practice, it is converged to ½ at a far distance by the action of the small current sources 32, 33 and an output characteristic having variations with respect to the theoretical line because of the S/N ratio is attained.

Figure 3B:
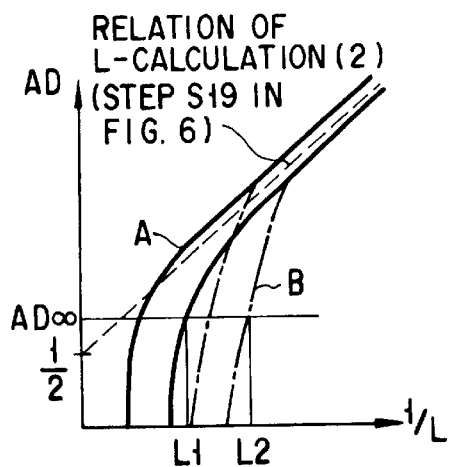

Further, the characteristic shown in FIG. 3A is a distance measurement characteristic for the measurement in the air, and the characteristic shown in FIG. 3B is a distance measurement characteristic for the measurement in the water. In the distance measurement characteristic shown in FIG. 3B, the inclination of the theoretical line is steeper than that of the distance measurement characteristic shown in FIG. 3A by the influence of the index of refraction of the water. The solid line A indicates the distance measurement characteristic when the water has a high degree of transparency, and the one-dot-dash line B indicates the distance measurement characteristic when the water has a low degree of transparency. As indicated by the one-dot-dash line B, the distance measurement characteristic starts to be bent at a distance near 1/L at which the distance measurement output AD=½ partly because the amount of reflected light is reduced by the absorption of light by the water but mainly because the amount the signal light scattered from the suspended matters in the water is large. For example, this is because the reflected signal light 17 is uniformly input to the PSD 19 even from a portion in which the subject is not present, for example, a portion 34 near the light receiving lens 18 shown in FIG. 2. If the PSD 19 is thus uniformly illuminated, the current signals i1, i2 may have substantially the same value and the value of i1/(i1 +i2) is set close to ½.

On the other hand, since the reflected signal light 17 from the subject 15 is reduced by the absorption of light by the water, the distance measurement characteristic starts to be deteriorated with respect to the theoretical line at a closer distance as indicated by the one-dot-dash line B in FIG. 3B, that is, at a portion at which 1/L is larger. Therefore, even if the distance measurement output AD of the distance measurement section 2 takes a preset output AD∞, the distance will be different in the case of the solid line A shown in FIG. 3B and in the case of the one-dot-dash line B.

In the first embodiment, since the underwater detecting section 4 for detecting the degree of transparency of the water is provided, it becomes possible for the CPU 1 to determine the case of solid line A or the case of one-dot-dash line B. Therefore, the auto-focusing can be attained in a range from the nearest position to a distance of L1 in the case of solid line A shown in FIG. 3B and in a range from the nearest position to a distance of L2 in the case of one-dot-dash line B and the pan-focusing is effected in a range exceeding the above distance.

Figure 4A:
FIGS. 4A and 4B are views showing the conditions of pictures photographed in the water.
Figure 4B:
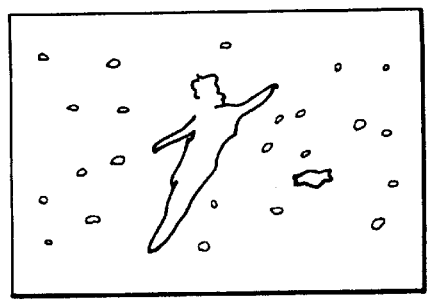

Even if the distance of L1 cannot be measured in the case of one-dot-dash line B, no serious problem will occur when taking into consideration that the photographer cannot see the subject in the muddy water. Further, in such a condition, sunlight is attenuated, and in the camera with the auto-electronic flash section, the stroboscopic photographing is effected. However, if the stroboscopic photographing is effected in the opaque water as described above, an inadequate photograph in which the whole portion is made whitish as shown in FIG. 4B tends to be obtained, and therefore, it is preferable to issue a warning and call a photographer's attention. Thus, films can be prevented from being vainly used.

Next, the underwater detecting section 4 and transparency detecting section 3 in the first embodiment are explained.

FIG. 5 is a diagram showing the constructions of the underwater detecting section 4 and transparency detecting section 3 in the first embodiment shown in FIG. 1.

In FIG. 5, the CPU 1 activates a light emitting diode (which is hereinafter referred to as LED) 41 via a light projection circuit 40 to emit light. A prism 42 reflects light emitted from the LED 41 in the air in the condition of critical angle and makes the light incident on a sensor 43. However, if the reflecting surface of the prism 42 is brought into contact with water, the condition of reflection at the critical angle cannot be satisfied and the amount of incident light on the sensor 43 is reduced.

Therefore, the CPU 1 controls the light projecting circuit 40 to activate the LED 41 for light emission and reads an output of the sensor 43 generated at this time by use of a first light reception circuit 44. Then, whether the camera is put in the water or in the air is determined according to the magnitude of the output.

In the water, light emitted from the LED 41 passes through the prism 42 and is made incident on the sensor 45, and a space LP for permitting entrance of water is provided between the prism 42 and the sensor 45. If the water having a low degree of transparency enters the space, the output of the sensor 45 is lowered, and if the water having a high degree of transparency enters the space, the output of the sensor 45 is raised. The CPU 1 detects the degree of transparency of the water according to the output of a second light receiving circuit 46 based on the following principle.

The CPU 1 determines the focusing distance based on information supplied from the distance measuring section 2, underwater detecting section 4 and transparency detecting section 3 and controls the focusing section 7. In the focusing section 7, the CPU 1 controls a motor driver (MD) 50 to drive a motor 51 and move a focusing lens 52 to a position corresponding to the above focusing distance. At this time, information of the position of the focusing lens 52 is fed back to the CPU 1 by an encoder such as a photo-interrupter (which is hereinafter referred to as PI) 53. As a result, the CPU 1 controls the motor driver 50 while monitoring the output of the PI 53.

Further, the CPU 1 controls the warning section 6 to give a warning to the photographer by use of an LED 6a in a case where the operation of controlling the amount of stroboscopic light from the electronic flash section 5 and the stroboscopic photographing in the opaque water are effected based on information from a light measuring section 8.

Next, the operation of the camera capable of photographing in water according to the first embodiment is explained.

Figure 6:
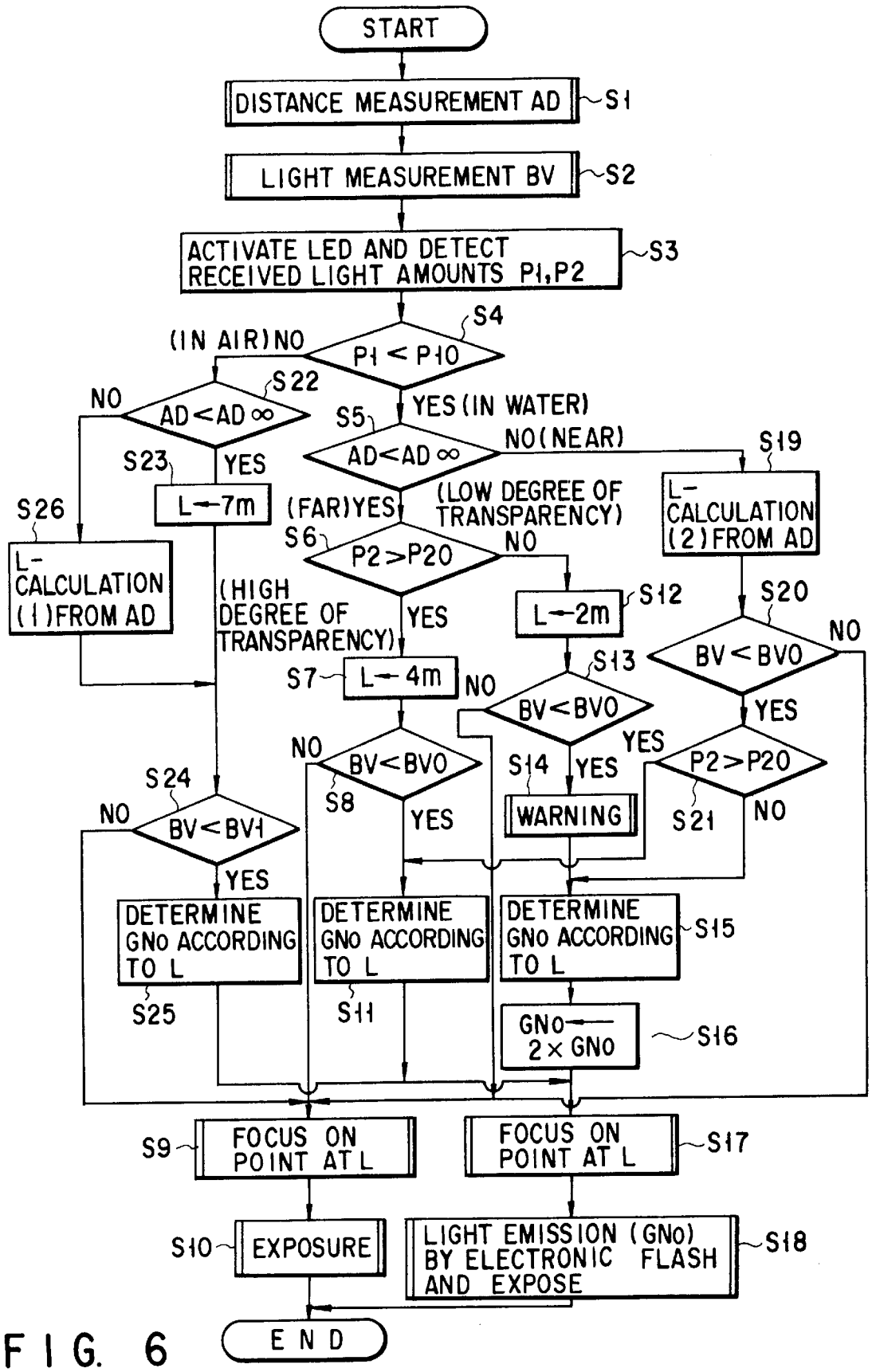
FIG. 6 is a flowchart for illustrating the process of a CPU 1 as the operation of a camera capable of photographing in water of the first embodiment.

FIG. 6 is a flowchart for illustrating the process of the CPU 1 as the operation of the camera capable of photographing in water according to the first embodiment.

When the photographer starts the photographing, the CPU 1 derives a distance measurement output AD by use of the distance measurement section 2 (step S1). Then, in order to determine the exposure condition, luminance information BV of the subject is derived by use of the light measuring section 8 (step S2). Further, the CPU 1 activates the LED 41 to emit light and detects outputs P1, P2 varying in proportion to the amounts of light incident on the sensors 43, 45 via the light receiving circuits 44, 46 (step S3).

Next, the CPU 1 determines whether or not the output P1 varying in proportion to the amount of light incident on the sensor 43 for underwater detection is smaller than an output P10 caused by a preset amount of light (step S4).

The output P10 caused by the preset amount of light is set to a value slightly larger than an output value of the sensor 43 obtained when it becomes impossible for the prism 42 to satisfy the condition of the critical angle. Therefore, when it is detected in the step S4 that the output P1 is smaller than the output P10 caused by the preset amount of light, it is determined that the camera is in the water and the step S5 is effected. On the other hand, when the output P1 is not smaller than the output P10 caused by the preset amount of light, it is determined that the camera is in the air and the step S22 is effected. The process including the step S22 and the succeeding steps indicates the distance measuring operation in the air.

Next, the CPU 1 determines in the step S5 whether or not the distance measurement output AD of the distance measuring section 2 is smaller than a preset output AD∞. In this case, if the distance measurement output AD is not smaller than the preset output AD∞, that is, if the distance measurement output AD is larger than or equal to the preset output AD∞ shown in FIG. 3B, the focusing distance L is derived according to the equation for the underwater photographing obtained by modifying the equation (4) (step S19) and the focal length of the photographing lens is adjusted to correspond to the focusing distance L. In a case where the distance measurement output AD is slightly larger than the preset output AD∞, it is deviated from the theoretical line, that is, the line indicated by the relation of the L-calculation (2) in FIG. 3B, but the camera is designed to cover the deviation by the depth of field.

Next, the CPU 1 determines whether or not luminance information BV is smaller than the preset luminance BV0 (step S20). By this operation, it determines based on the luminance information BV whether light emission of the electronic flash section is necessary or not. If the luminance information BV is not smaller than the preset luminance BV0, the process proceeds to the step S9 to adjust the focusing lens to a position corresponding to the focusing distance L and the exposing operation is effected in the step S10.

On the other hand, if it is determined in the step S20 that the luminance information BV is smaller than the preset luminance BV0, that is, when light emission of the electronic flash section is necessary, the process proceeds to the step S21 to determine the degree of transparency of the water according to whether or not the output P2 varying in proportion to the amount of light incident on the transparency detecting sensor 45 is larger than an output P20 caused by a preset amount of light. If the output P2 is not larger than the output P20 caused by the preset amount of light, it is determined that the degree of transparency is low and the step S15 is effected to calculate an amount GNo of light from the electronic flash section according to the focusing distance L. Then, the light amount GNo derived in the step S15 is doubled to determine the light amount GNo of light from the electronic flash section at the time of photographing (step S16). This is a measure to cope with a case wherein light is difficult to reach the subject in the water having a low degree of transparency. Then, the focusing position is set to correspond to the focusing distance L (step S17) and the electronic flash section is activated to emit light by the light amount GNo derived in the step S16 and effect the exposing process (step S18).

If it is determined in the above step S21 that the output P2 is larger than the output P20 caused by the preset amount of light, it is determined that the degree of transparency is high and the step S11 is effected. In the step S11, the light amount GNo of the electronic flash section is calculated according to the focusing distance L and then the step S17 is effected. In the step S17, the focusing position is adjusted to correspond to the focusing distance L and the electronic flash section is activated to emit light by the light amount GNo derived in the step S11 and effect the exposing process (step S18).

Next, a case wherein it is determined in the step S5 that the distance measuring output AD is smaller than the preset output AD∞ and the process proceeds to the step S6 is explained.

The process including the step S6 and the succeeding steps corresponds to a process effected in a case where the distance measuring output AD of the distance measuring section 2 shown in FIG. 3B is deviated from the theoretical value, that is, where the subject lies in an area at a relatively far distance.

Like the step S21, the CPU 1 determines whether or not the output P2 varying in proportion to the amount of light incident on the transparency detecting sensor 45 is larger than the output P20 caused by the preset light amount (step S6). If the output P2 is not larger than the output P20 caused by the preset light amount, it is determined that the degree of transparency is low and the process proceeds to the step S12, and if the output P2 is larger than the output P20, it is determined that the degree of transparency is high and the process proceeds to the step S7.

The focusing distance obtained when the degree of transparency is high and the distance measuring output AD is smaller than the preset output AD∞ is longer than the distance L1. Further, the focusing distance obtained when the degree of transparency is low and the distance measuring output AD is smaller than the preset output AD∞ is longer than the distance L2. In this case, for example, the focusing distance L is set to 4 m longer than the distance L1 in the step S7 and to 2 m longer than the distance L2 in the step S12 according to data previously derived by the measurement as shown in FIG. 3B and then the next step is effected.

Next, the step S8, S13 respectively following the step S7, S12 is effected and the CPU 1 determines whether or not the luminance information BV is smaller than preset luminance BVo. If it is determined in the step S13 that the luminance information BV is smaller than the preset luminance BVo and the light emission of the electronic flash section of the electronic flash section is necessary, the CPU 1 activates the LED 6a via the warning section 6 (step S14) and effects the step S15. As a result, a warning indicating that the picture may be made whitish because of light reflection from suspended matters and becomes inadequate is given to the photographer. The step S15 and the succeeding steps are effected as described above.

In order to prevent films from being vainly used, the process of permitting the photographing only when the shutter button is depressed twice after the warning is given in the step S14 may be provided. Further, the electronic flash section may be automatically turned OFF.

On the other hand, if it is determined in the step S13 that the luminance information BV is not smaller than the preset luminance BVo and light emission by the electronic flash section is not necessary, it is determined that the subject lies in a bright area and the step S9 is effected to take a photograph without using the electronic flash section. The succeeding steps are effected as described above.

When the degree of transparency is high, no warning is made even if it is determined in the step S8 that the luminance information BV is smaller than the preset luminance BV0, that is, even if the subject is put in a dark condition. This is because no suspended matters are present when the degree of transparency is high and there is no possibility that the photograph will be made inadequate by the scattering light of electronic flash section. Further, it is determined that the degree of attenuation of light is small and a step such as the step S16 of increasing the amount of light is not provided. Therefore, if it is determined in the step S8 that the luminance information BV is smaller than the preset luminance BV0, the step S11 is effected. The succeeding steps are effected as described before.

If it is determined in the step S8 that the luminance information BV is not smaller than the preset luminance BV0, that is, when the subject is put in a sufficiently bright condition, the step S8 is effected. The succeeding steps are effected as described before.

Next, the process of photographing in the air when the process proceeds from the step S4 to the step S22 is explained.

The CPU 1 determines whether or not the distance measurement output AD of the distance measuring section 2 is smaller than the preset output AD∞ (step S22). When the distance measurement output AD is not smaller than the preset output AD∞, the focusing distance L is derived according to the following equation which is obtained by modifying the equation (4) (step S26).

$$1/L = 1/C(AD - \frac{1}{2}) \quad (8)$$

This is indicated by the theoretical line, that is, the relation of L-calculation (1) shown in FIG. 3A.

On the other hand, if it is determined in the step S22 that the distance measurement output AD is smaller than the preset output AD∞, L derived by use of the equation (8) becomes an erroneous distance so that the focusing distance will be set to a preset distance of 7 m to prevent fuzziness of the photograph by use of the depth of field (step S23).

Next, the CPU 1 determines whether or not the luminance information BV is smaller than preset luminance BV1 (step S24). By this operation, it determines based on the luminance information BV whether stroboscopic light emission is necessary or not. The preset luminance BV1 used as a determination level may be set to a level lower than the preset luminance BV0 used as a determination level in the steps S8, S13, S20 of the process for photographing in the case of underwater. This is because the holding state of the camera is stable in the air and the unintentional movement of hands will not often occur in comparison with the case of underwater.

If the luminance information BV is smaller than the preset luminance BV1, that is, when the light emission from the electronic flash section is necessary, the following equation is calculated based on the derived focusing distance L to derive the light amount GNo of the electronic flash section (step S25) and the step S17 is effected.

$$GNo = FNo \times L \quad (9)$$

where FNo is an F number of the photographing lens. The succeeding steps are effected as described before.

on the other hand, if it is determined in the step S24 that the luminance information BV is not smaller than the preset luminance BV1, that is, when the light emission from the electronic flash section is not necessary, the step S9 is effected. The succeeding steps are effected as described before.

As described above, according to the first embodiment, the photographing can be fully automatically effected with correct focusing and correct exposure without receiving the influence of the transparency of the water in the case of photographing in the water by detecting whether the camera is used in the water or in the air (on land). Therefore, even a beginner can enjoy the photographing in the water as in the case of photographing in the air (on land).

Further, since control of the light emission by the electronic flash section is effected by taking the degree of transparency of the water into consideration, it is possible to prevent the light exposure from becoming underexposed even in the water having a low degree of transparency.

Further, in the first embodiment, it is possible to enhance the reliability of focusing by detecting the degree of transparency of the water by use of the distance measurement output AD of the distance measuring section 2 and the transparency detecting section 3 when the focusing distance is derived. In addition, in the first embodiment, determination of the light amount P2 which is an output of the transparency detecting sensor 45 is made simply by making an alternative judgment, that is, by determining whether it is larger or smaller than the preset light amount P20, but by more finely determining the light amount by use of a plurality of determination levels, the reliability of focusing can be further enhanced.

Further, the degree of transparency of the water is taken into consideration only in a portion in which the focusing distance is longer than the preset output AD∞ by the distance measurement, but by more finely determining the measurement output AD by using a plurality of determination levels and correcting the measurement output AD by use of the degree of transparency, the effect can be further enhanced.

Further, since the operation illustrated by the flowchart of FIG. 6 is automatically effected by the camera when the shutter is depressed, the photographer can take an underwater photograph without fail in the same procedure as in the case of fully automatic camera for use in the air (on land) which is conventionally used in the air.

Next, the underwater detecting section 4 and transparency detecting section 3 in the modification of the first embodiment are explained.

FIG. 7 is a diagram showing the constructions of the underwater detecting section 4 and transparency detecting section 3 in the modification of the first embodiment.

In this modification, the prism 42 shown in FIG. 5 is not necessary and it is not necessary to introduce water between the prism 42 and the sensor 45. The construction and operation of the distance measuring section 2, for example, light projection by the Xe tube of the light projecting source 11 and light reception of the reflected signal light 17 by the PSD 19 are the same as those explained in the first embodiment shown in FIG. 2. However, in this modification, the underwater detecting section 4 and transparency detecting section 3 are constructed by use of the distance measuring light 16 and reflected signal light 17 to detect the corresponding light.

That is, reflected signal light 17a from the subject 15 is received into a sensor 63 via a light receiving lens 61 and visible light cut-off filter 62. An output corresponding to the light amount detected by the sensor 63 is input to the CPU 1 via a first light receiving circuit 64. Since the degree of absorption of infrared light in the water is extremely high, the output of the sensor 63 tends to be small in comparison with that in the air.

Since no visible light cut-off filter is provided in the PSD 19, whether the camera lies in the water or in the air is determined according to the ratio of the light amount detected by the sensor 63 and the light amount detected by the PSD 19. The underwater detecting section 4 in this modification is thus constructed to effect the underwater detecting operation.

Further, light in a neighboring portion 16a in front of the light projecting lens 14 shown in FIG. 7 is received into a sensor 66 via a light receiving lens 65. An output corresponding to the light amount detected by the sensor 66 is input to the CPU 1 via a second light receiving circuit 67.

If the degree of transparency of the water is low, the distance measurement light 16 collides against suspended small particles and the light is vigorously scattered in the neighboring portion 16a in front of the light projecting lens 14 shown in FIG. 7. Therefore, in the water having a low degree of transparency, the scattered light of the distance measurement light 16 is made incident on the sensor 66 and the light amount detected by the sensor 66 is increased. On the other hand, in the water having a high degree of transparency or in the air containing no particles, vigorous light scattering will not occur in the neighboring portion 16a in front of the light projecting lens 14 and the distance measurement light 16 will not be made incident on the sensor 66. The transparency detecting section 3 in this modification is thus constructed to effect the transparency detecting operation.

Figure 8:
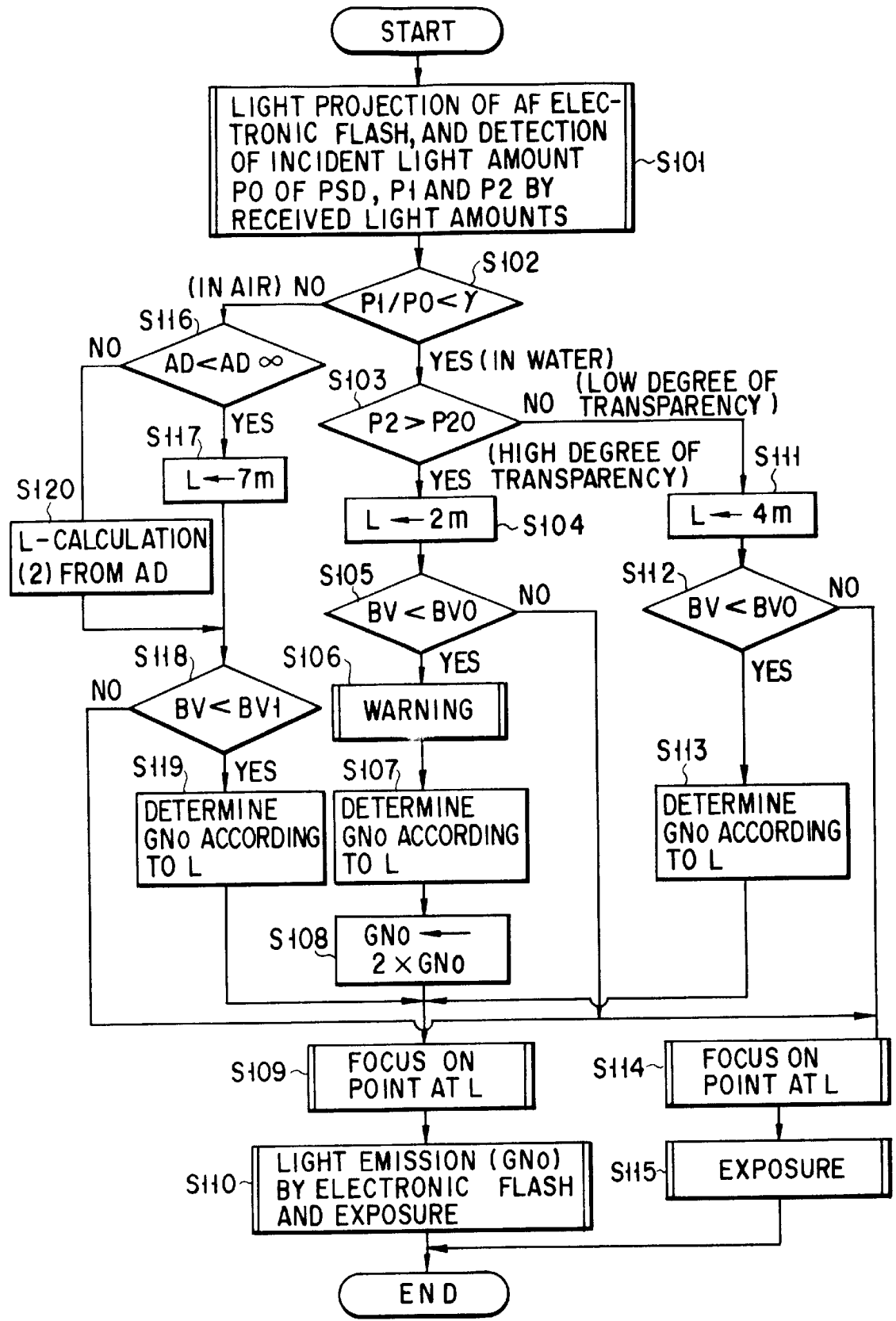
FIG. 8 is a flowchart for illustrating the process of a CPU 1 as the operation of a camera capable of photographing in water according to the modification of the first embodiment.

FIG. 8 is a flowchart for illustrating the process of the CPU 1 as the operation of the camera capable of photographing in water according to the modification of the first embodiment.

The distance measurement light 16 is emitted from the Xe tube used as the light projecting source 11, and an output Po caused by the amount of light incident on the PSD 19 in synchronism with the above light emission, and outputs P1, P2 caused by the amount of lights respectively incident on the sensors 63, 66 are detected (step S101). They are values obtained by eliminating the light amount caused by so-called background light which is constantly made incident on the respective sensors by use of a background light eliminating circuit 35 and detecting only outputs caused by the projected distance measurement light 16. Therefore, in the modification shown in FIG. 7, the first and second light receiving circuits 64, 67 for exclusive use are provided, but it is also possible to input the light to an AF circuit 60 and make use of the background light eliminating function thereof.

Next, the CPU 1 determines whether the ratio of the output P1 varying in proportion to the amount of light incident on the sensor 63 to the output Po varying in proportion to the amount of light incident on the PSD 19 is smaller than a preset ratio γ or not (step S102). That is, if "P1/Po" is smaller than the preset ratio γ, it is determined that the camera lies in the water in which infrared light is easily absorbed and the step S103 is effected. On the other hand, if "P1/Po" is not smaller than the preset ratio γ, it is determined that the camera lies in the air in which infrared light is not easily absorbed and the step S116 is effected.

Next, in the step S103, whether the output P2 varying in proportion to the amount of light incident on the sensor 66 is larger than a preset level output P20 or not is determined.

By the above operation, the distance measurement light 16 is scattered by suspended particles in the water in the portion near and in front of the light projecting lens 14 when the degree of transparence of the water is low, and therefore, a large amount of scattered light is made incident on the sensor 66 arranged to receive the light from the neighboring portion 16a. The neighboring portion 16a is set relatively near the light projecting lens 14 so that the subject will not lie in this portion.

That is, in the step 103, if the output P2 is larger than the preset level output P20, it is determined that suspended particles which scatter the light are present and the degree of transparency of the water is low, and the step S104 is effected. On the other hand, if the output P2 is not larger than the preset level output P20, it is determined that suspended particles which scatter the light are not present and the degree of transparency of the water is high, and the step S111 is effected.

The process including the step S104 and the succeeding steps S105–S110 is the same as the process including the steps S13–S18 and the succeeding steps shown in the first embodiment of FIG. 6, the process including the step S111 and the succeeding steps S112–S115 is the same as the process including the step S7 and the succeeding steps S8–S11 shown in FIG. 6, and the process including the step S116 and the succeeding steps S117–S120 is the same as the process including the step S22 and the succeeding steps S23–S26 shown in FIG. 6, and they are incorporated in corresponding portions and the explanation therefor is omitted.

As described above, according to the modification of the first embodiment, the photographing can be fully automatically effected with correct focusing and correct exposure without receiving the influence of the transparency of the water in the case of photographing in the water by detecting whether the camera is used in the water or in the air (on land). Therefore, even a beginner can enjoy the photographing in the water as in the case of photographing in the air (on land).

Further, a camera capable of effecting the photographing in water and in air and easily taking a beautiful and focused photograph irrespective of the degree of transparency of the water when used in the water can be provided with simple construction.

Further, since control of the light emission by the electronic flash section is effected by taking the degree of transparency of the water into consideration, it is possible to prevent the light exposure from becoming underexposed even in the water having a low degree of transparency.

Further, in this modification, it is possible to enhance the reliability of focusing by detecting the degree of transparency of the water by use of the distance measurement output AD of the distance measuring section 2 and the transparency detecting section 3 when the focusing distance is derived. In addition, in this modification, determination of the output P2 of the underwater detecting sensor 66 is simply made by determining whether it is larger or smaller than the preset output P20, but by more finely determining the output, the reliability of focusing can be further enhanced.

Further, since the operation illustrated by the flowchart of FIG. 8 is automatically effected by the camera when the shutter is depressed, the photographer can take underwater photographs without fail in the same procedure as in the case of a fully automatic camera for use in the air (on land) which is conventionally used in the air.

In the modification of the first embodiment, since the distance measuring light 16 is used as described before, the LED 41 and prism 42 for exclusive use are not necessary unlike the first embodiment shown in FIG. 5 and it is not necessary to introduce water into the camera.

Next, a camera capable of photographing in water of the second embodiment according to this invention will be described.

This invention can be applied not only to the active type AF for distance measurement by projecting light to the subject but also to the passive type AF for distance measurement by use of luminance information of the subject.

Figure 9:
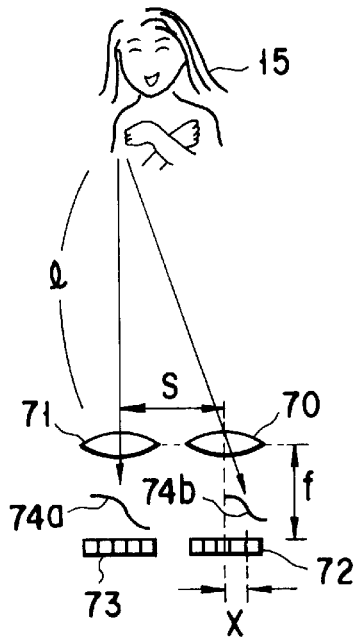
FIG. 9 is a view for illustrating the principle of passive type AF.

FIG. 9 is a view for illustrating the principle of the passive type AF.

Light receiving lenses 70, 71 for receiving light from the subject create images of the subject 15 on respective sensor arrays 72, 73. Each of the sensor arrays 72, 73 is constructed by an array of light receiving elements and generates an output corresponding to the brightness of the image of light incident thereon via the light receiving lens 70 or 71 from the light receiving elements.

For example, if the light receiving lenses 70, 71 are set to face a boundary portion between the hair and face of the subject 15, step-like luminance differences 74$a$, 74$b$ indicating the brightness as shown in FIG. 9 appear on the sensor arrays 72, 73. At this time, electrical signals corresponding to the luminance differences 74$a$, 74$b$ are output by the sensor arrays 72, 73 and the distance L to the subject can be derived as follows according to the positional difference X between the stepped portions of brightness.

$$L = S \cdot f / x \qquad (10)$$

That is, in the active type AF of projection type, the triangulation is effected with the position of the projected light set as a reference, but in the passive type AF of the second embodiment, the triangulation is effected with the brightness stepped position of the image of one of the light receiving systems set as a reference.

Figure 10A:
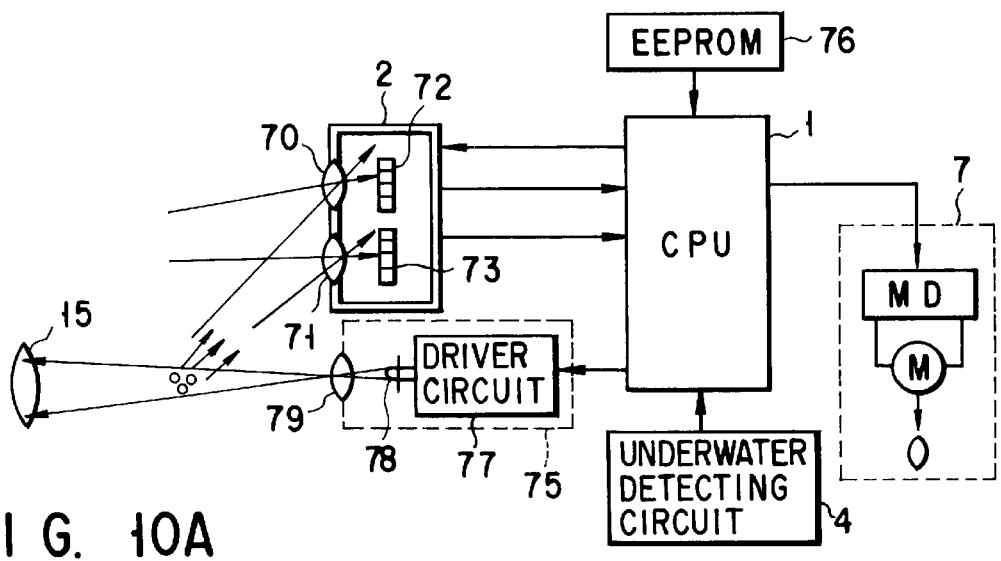
FIG. 10A is a diagram showing the schematic construction of a camera capable of photographing in water according to a second embodiment in which the above passive type AF is used.

FIG. 10A is a diagram showing the construction of a camera capable of photographing in water according to the second embodiment of this invention in which the above passive type AF is used.

The camera capable of photographing in water includes a CPU 1, a distance measuring section 2 constructed as shown in FIG. 9, a focusing section 7, an underwater detecting section 4, a light projecting section 75 and an EEPROM 76 which is a programmable non-volatile memory.

The CPU 1 gives an instruction to a driver circuit 77 so as to drive a light projecting unit 78 to emit light. The projected light is emitted in the forward direction via a light projecting lens 79.

As already explained with reference to FIG. 7, when the degree of transparency of the water is low, that is, in the muddy water, suspended matters causing the muddiness in front of the light projecting lens 79 reflect and scatter light emitted from the light projecting lens 79. The scattered lights are caused to pass through the lenses 70, 71 and made incident on those end portions of the sensor arrays 72, 73 which lie at a farther distance from the light projecting system as shown in FIG. 10A.

On the other hand, when only a small amount of suspended matters are present, the amount of light incident on the sensor arrays 72, 73 is reduced, and when no suspended matters are present, the scattered lights are not made incident on the sensor arrays 72, 73. Therefore, in the second embodiment, the degree of muddiness of the water is evaluated according to the amount of light incident on the sensor arrays 72, 73.

Figure 10B:
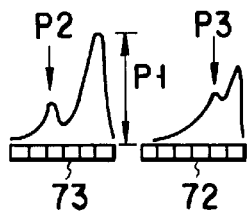
FIG. 10B is a diagram showing outputs of sensor arrays 72, 73 when the water is muddy.

Since the sensor array 72 is set at a farther distance from the light projecting system, it cannot receive a large amount of neighboring scattered lights in comparison with the sensor array 73. Therefore, outputs generated from the respective light receiving elements and corresponding to the distribution of light intensity on the sensor arrays 72, 73 may be obtained as shown in FIG. 10B. The output P1 indicates the peak caused by the scattered light, and the outputs P2, P3 indicate the peaks of reflected lights projected on the subject 15 by the light projecting unit 78 and reflected from the subject 15.

Figure 10C:
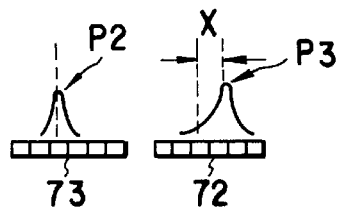
FIG. 10C is a diagram showing outputs of the sensor arrays 72, 73 when the water is clean.

If the water is not muddy, the peak indicated by the output P1 shown in FIG. 10B is not present in the outputs caused by light received by the sensor arrays 72, 73 and only the peaks of the outputs P2, P3 are present as shown in FIG. 10C.

Therefore, the distance to the subject can be derived by the equation (10) according to the positional difference X between the peaks of the outputs generated from the two sensor arrays 72, 73.

In the above case, the correct distance measurement can be attained even in the water, but in a case shown in FIG. 10B, the outputs P2, P3 caused by the normal signal lights are obscured by the output P1 caused by the scattered light and the correct distance measurement cannot be attained.

Figure 11A:
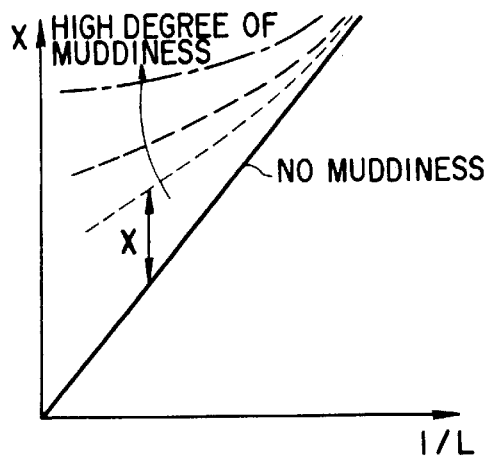
FIG. 11A is a diagram showing the relation between the reciprocal 1/L of the distance L to the subject and a positional difference X between the peaks of outputs from the sensor arrays 72 and 73 shown in FIG. 10C.

FIG. 11A is a diagram showing the relation between the reciprocal 1/L of the distance L to the subject and a positional difference X between the peaks of outputs generated from the sensor arrays 72 and 73 shown in FIG. 10C.

The above relation becomes linear when there is no muddiness, but the relation is influenced by the scattered light shown as the output P1 in FIG. 10B and deviates from the linear relation when the degree of muddiness becomes high.

An error caused by the deviation from the linear relation becomes larger as the subject lies at a farther distance and becomes more obscure. Therefore, the error $\Delta x$ can be estimated by the degree of muddiness and the distance.

Figure 11B:
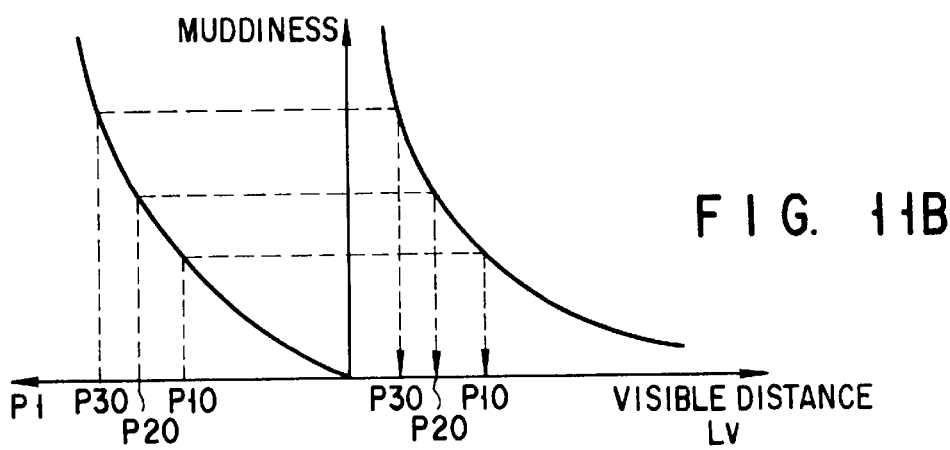
FIG. 11B is a diagram showing the relation between the distance (visible distance) Lv at which the photographer can visually recognize the subject in the muddy water, output P1 caused by scattering light, and muddiness.

Further, in the muddy water, the distance (visible distance) Lv within which the photographer can visually recognize the subject becomes shorter and a graph indicating the relation of the distance and the degree of muddiness together with the relation between the output P1 caused by the scattered light and the degree of muddiness is shown in FIG. 11B. Based on the graph shown in FIG. 11B, the upper limit distance Lv within which the photographer can visually recognize the subject in the water can be derived from the output P1 caused by the peak light amount of the scattered light. The operation effected at the time of photographing in the water is shown in FIG. 12 when taking the above relation into consideration and supposing that an object lying at a distance farther than the distance Lv will not be photographed.

FIG. 12 is a flowchart for illustrating the process of the CPU 1 as the operation of the camera capable of photographing in water according to the second embodiment.

The CPU 1 activates the light projecting unit 78 to emit light, derives a positional difference X at a spot portion from an output varying in proportion to the amount of light incident on the sensor arrays 72, 73, and detects the output P1 of the light receiving element on the end portion of the sensor array 73 (step S130).

The error $\Delta x$ shown in FIG. 11A is derived based on the thus obtained output P1 and positional difference X (step S131). Since the error $\Delta x$ can be derived from the distance to the subject and the output P1 as described above, the error $\Delta x$ can be derived from the positional difference X and the output P1. Specifically, a table for deriving the error $\Delta x$ from the positional difference X and the output P1 is stored in the memory of the CPU 1 and the error Δx is obtained by referring to the table.

The table is created by actually effecting the distance measurement in the muddy water, calculating the error Δx from the output P1 and the positional difference X, and storing the result of calculation into an EEPROM 76 which is a programmable memory.

Then, by using the error Δx obtained from the above table and the equation (10), the distance L to the subject is derived (step S132).

Next, by using the relation shown in FIG. 11B, the farthest distance Lv at which the photographing can be effected is derived (step S133).

After this, the CPU 1 determines whether or not the corrected and calculated distance L to the subject is longer than the distance Lv (step S134). In this case, if the distance L to the subject is not longer than the distance Lv, the step S135 is effected. In the step S135, the distance L to the subject derived in the step S132 is set as the focusing distance Lp.

The focal length is adjusted to correspond to the thus obtained focusing distance Lp (step S136) and the exposing operation is effected (step S137).

On the other hand, if it is determined in the step S134 that the distance L to the subject is longer than the distance Lv, the step S138 is effected. In the step S138, the focusing distance Lp is fixed to the distance Lv since the photographer cannot visually recognize the subject lying at a distance farther than the distance Lv and then the step S136 is effected. The process including the step S136 and the succeeding steps is effected as described before. Thus, the process illustrated by this flowchart is completed.

As the light projecting unit 78 in the second embodiment shown in FIG. 9, it is preferable to use an LED emitting blue light which is less attenuated in the water. At present, as the above LED, high-power LEDs for emitting bluish green light of 500 nm having InGaN formed as the material of the light emitting layer on the sapphire substrate are manufactured.

As described above, in the second embodiment, a camera capable of photographing in water which can correctly measure the distance even in the water or in the air can be provided by simply additionally providing one light projecting unit like the light projecting unit 78 shown in FIG. 9.

Further, in the so-called passive type AF used in the second embodiment, the distance measurement cannot be effected when no luminance difference occurs on the subject and the luminance of the subject itself is low and dark, that is, when the contrast thereof is low, but the technique for permitting the distance measurement by projecting auxiliary light in the above case is known. In the second embodiment, by commonly using the auxiliary light and the underwater light source of the light projecting unit 78, a rise in the cost can be suppressed.

Next, a camera capable of photographing in water according to the modification of the second embodiment is explained. This modification also utilizes the passive type AF.

Figure 13:
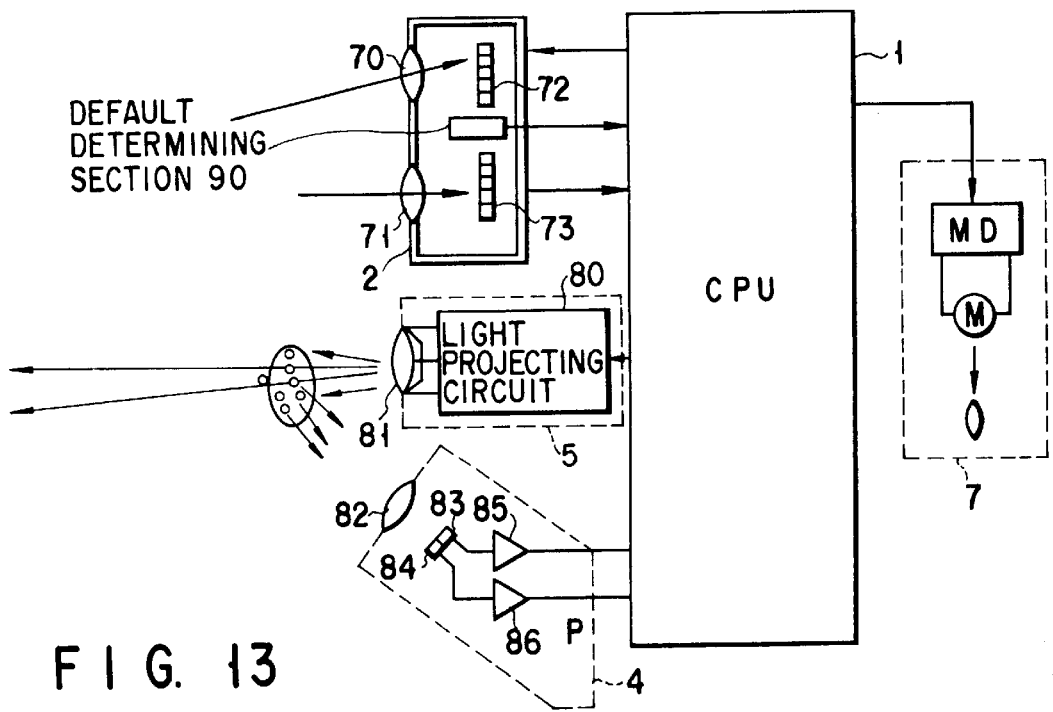
FIG. 13 is a diagram showing the schematic construction of a camera capable of photographing in water according to the modification of the second embodiment.

FIG. 13 is a diagram showing the construction of a camera capable of photographing in water according to the modification of the second embodiment.

This modification does not utilize the light projecting unit 78 as the auxiliary light and uses an electronic flash section 5 of the camera having an electronic flash section contained therein as a light source. However, a sensor used as the underwater detecting section 4 is additionally provided so as to be commonly used as a transparency detecting sensor.

The CPU 1 activates a light projecting circuit 80 so as to cause an electronic flash section 81 to emit light. The underwater detecting section 4 is constructed by a sensor 83 for receiving infrared light of the light received by a light receiving lens 82, a sensor 84 for receiving visible light, and amplifiers 85 and 86 provided for the respective sensors.

As described before, water has a property of absorbing light, the absorption factor for infrared light is large and the absorption factor for visible light is small according to the spectral characteristic. It is understood that the absorption factors are different from each other by two figures. The visible light component and infrared light component which are uniform in the air are not uniform in the water.

Therefore, it is possible to determine that the underwater detecting section 4 lies in the water when the amount of light incident on the sensors 83, 84 is not uniform and the amount of infrared light is extremely small. Then, the CPU 1 converts analog values output from the amplifiers 83, 84 into digital values corresponding to the analog values (analog/digital conversion) and compares the digital values with each other to effect the underwater detection for determining whether it lies in the water or not.

Further, the sensor 84 in the underwater detecting section 4 is arranged to monitor scattered light near and in front of the electronic flash section 81 so as to detect scattered light caused at the time of light emission from the electronic flash section 81. Therefore, if the value obtained by amplifying and inputting an output of the sensor 84 generated at the time of light emission from the electronic flash section is set to P, the CPU 1 effects the muddiness detection based on the value P.

A default determining section 90 in the distance measuring section 2 is a circuit for outputting a default value to the CPU 1 when the distance measurement cannot be made.

Figure 14:
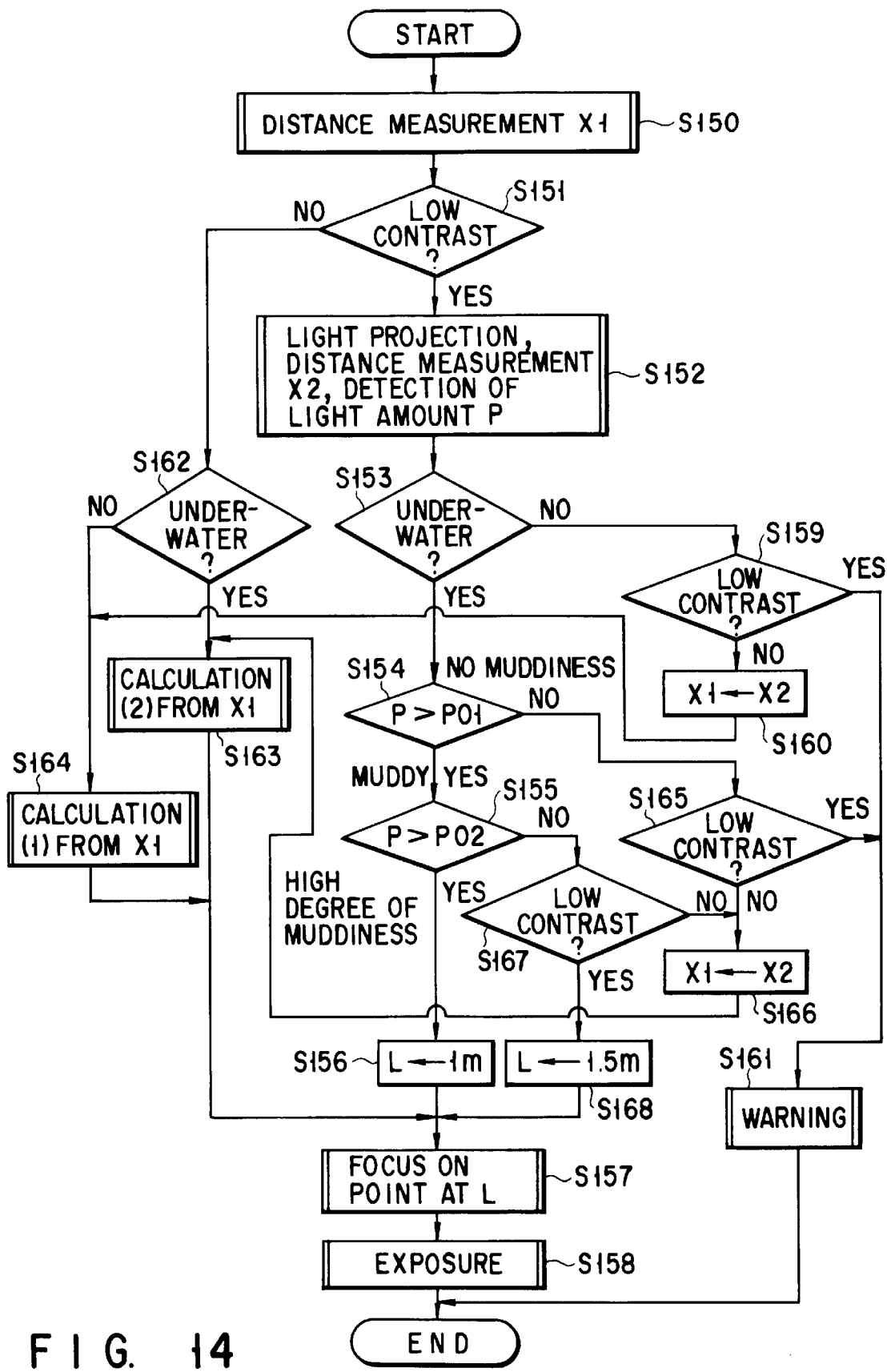
FIG. 14 is a flowchart for illustrating the process of a CPU 1 as the operation of the camera capable of photographing in water according to the modification of the second embodiment.

FIG. 14 is a flowchart for illustrating the process of the CPU 1 as the operation of the camera capable of photographing in water according to the modification of the second embodiment.

When the photographer starts to take photographs, the CPU 1 detects the positional difference X of the image-forming point based on the luminance distribution of the subject by use of the distance measuring section 2 (refer to FIG. 9) (step S150).

Next, the CPU 1 determines whether the contrast is low or not (step S151). In this case, if the contrast is low, that is, when no luminance difference occurs on the subject, the illumination is insufficient, or the contrast is low by the influence of suspended matters in the water, then the step S152 is effected to cause the electronic flash section 5 to emit light and detect an output P based on the positional difference X2 between the peaks and the amount of light received by the sensor 84 by use of the emitted light as auxiliary light. Whether the contrast is low or not is determined by the default determining section 90.

Then, the CPU 1 determines whether it lies in the water or not (step S153). If it is determined that it lies in the water, the step S154 is effected to determine whether the output P is larger than the output P01 caused by the preset light amount or not. If the output P is larger than the output P01 caused by the preset light amount, the step S155 is effected to determine whether the output P is larger than an output P02 caused by a preset light amount. A value larger than the output P01 is used as the output P02 in the step S155. By the above steps 154, 155, the degree of muddiness is detected.

If it is determined in the step S154 that the output P is not larger than the output P01 caused by the preset light amount, it is determined that there is no muddiness and the step S165 is effected to determine whether the contrast is low or not. If the contrast is low, the step S161 is effected to give a warning that the photographing cannot be effected and the process of this flowchart is completed. On the other hand, if the contrast is not low, the step S166 is effected to set X2 derived in the step S152 to X1 and calculate the focusing distance Lp based on X1 (step S163).

Then, the focal length is adjusted to correspond to the focusing distance Lp (step S157) and the exposing operation is effected (step S158). After this, the process of this flowchart is completed.

If it is determined in the step S154 that the output P is larger than the output P01 caused by the preset light amount and it is determined in the step S155 that the output P is not larger than the output P02 caused by the preset light amount, it can be considered that the water is muddy but the degree of muddiness is not so high, and the step S167 is effected to determine whether the contrast is low or not. If the contrast not low, the step S166 is effected. The process including the step S166 and the succeeding steps is effected as described before.

If it is determined in the step S167 that the contrast is low, it is considered that the subject to be photographed is visible but the auxiliary light is absorbed by the muddy water and the peak cannot be detected, and the step S168 is effected to set a preset distance of 1.5 m as the focusing distance Lp and then the step S157 is effected. The value is determined based on the fact that the distance Lv within which an object can be visually recognized in the water is limited according to the degree of muddiness shown in FIG. 11B. Therefore, even if the focusing distance is set to a longer distance, it is impossible to take a clean photograph because of the muddy water. The process including the step S157 and the succeeding steps is effected as described before.

If it is determined in the step S154 that the output P is larger than the output P01 caused by the preset light amount and it is determined in the step S155 that the output P is larger than the output P02 caused by the preset light amount, it can be considered that the degree of muddiness of the water is relatively high and the step S156 is effected. At this time, even if it is not determined that the contrast is low, it can be considered that erroneous distance measurement is made according to the output P1 caused by the peak of the scattered light as shown in FIG. 10B.

Therefore, in the step S156, the focusing distance Lp is fixed to a distance of 1 m which is shorter than the distance 1.5 m set in the step S168 and then the step S157 is effected. Thus, the focal length is adjusted to correspond to the focusing distance Lp (step S157) and the exposing operation is effected (step S158). After this, the process of this flowchart is completed.

If it is determined in the step S153 that the camera does not lie in the water, the step S159 is effected to determine whether the contrast is low or not. If the contrast is low, the step S161 is effected. The process including the step S161 and the succeeding steps is effected as described before. On the other hand, if the contrast is not low, X2 derived in the step S152 is set to X1 (step S160) and the focusing distance Lp is calculated based on X1 (step S163), and then the step S157 is effected. The process including the step S157 and the succeeding steps is effected as described before.

If it is determined in the step S151 that the contrast is not low, the step S162 is effected to determine whether the camera lies in the water or not. Since the focusing distance becomes different according to whether the camera is in the water or in the air, the focusing distance Lp is calculated based on X1 after determining whether the camera is in the water or not by the above method (step S163, S164), and then the step S157 is effected.

After this, as described before, the focal length is adjusted to correspond to the focusing distance Lp (step S157) and the exposing operation is effected (step S158). Then, the process of this flowchart is completed.

As explained above, in the modification of the second embodiment, since the underwater detecting sensor is also used as the water muddiness detecting sensor and the electronic flash section contained in the camera is also used as the light projecting source for water muddiness detection, a camera capable of photographing in water which can take photographs in a correctly focused condition even in the water can be provided by simply adding the underwater detecting section 4 to a camera used in the air (on the ground).

With the above device, it becomes possible to make the distance measurement in a fog or smoke which was considered difficult to be made even in the air when using the conventional AF.

Further, according to the above embodiments of this invention, the following construction can be obtained.

(1) A camera capable of photographing in water, comprising a pair of optical sensor arrays on which an object image to be measured is formed via spatially different optical paths; and a distance measuring device for deriving a distance to the object based on the relative positional difference between received light intensity distributions of respective optical sensors of the optical sensor arrays; characterized by comprising underwater determining means for determining whether the camera lies in the water or on land; and muddiness detecting means for evaluating the degree of muddiness of the water when the camera lies in the water and characterized in that the underwater determining means determines the focusing position based on an output of the distance measuring means and an output of the muddiness detecting means.

(2) The camera capable of photographing in water described in the item (1), characterized in that the distance measuring device includes default detecting means and characterized by comprising focusing means for adjusting the focal length to correspond to a distance determined by the muddiness detecting means when the default detecting means outputs a default signal.

(3) The camera capable of photographing in water described in the item (1), characterized by comprising an auxiliary light source for projecting light when measuring the distance to the object; and correction means having optical sensor means for monitoring a neighboring portion of the light projecting section of the auxiliary light source as the muddiness detecting means, for correcting an output of the distance measuring means according to an output of the optical sensor means at the time of light projection of the auxiliary light source when the camera lies in the water.

(4) A camera capable of photographing in water, comprising distance measuring means for measuring the distance to an object; and focus adjusting means for determining the focusing distance according to an output of the distance measuring means; characterized by comprising muddiness detecting means for detecting the degree of muddiness of the water; and regulating means for regulating the farthest point adjusted by the focus adjusting means based on an output of the muddiness detecting means.

(5) A camera capable of photographing in water, comprising focus adjusting means for driving a photographing lens to effect the focus adjustment; light projecting means having an electronic flash device as a light source, for projecting a light beam towards an object; light receiving means for receiving a reflected light beam from the object caused by the light beam projected from the light projecting means and outputting information of distance to the object; water detecting means for optically detecting that the surrounding medium is water; transparency evaluating means for evaluating the degree of transparency of the medium when an output indicating that the medium is water is generated from the water detecting means; and control means for setting the focusing position of the photographing lens and controlling the focus adjusting means based on an output of the light receiving means and an output of the transparency evaluating means when an output indicating that the medium is water is generated from the water detecting means.

(6) A camera capable of photographing in water, comprising focus adjusting means for driving a photographing lens to effect the focus adjustment; light projecting means having an electronic flash device as a light source, for projecting a light beam towards an object; light receiving means for receiving a reflected light beam from the object caused by the light beam projected from the light projecting means and outputting information of distance to the object; first photoelectric converting means arranged near the light receiving means, for receiving the reflected light beam from the object caused by the projected light beam via a visible light cut-off filter; water detecting means for detecting that the medium surrounding the camera is water by comparing an output of the light receiving means with an output of the first photoelectric converting means; second photoelectric converting means for receiving scattered light from a portion near the light emitting portion of the light projecting means; and transparency evaluating means for evaluating the degree of transparency of the medium according to an output of the second photoelectric converting means; and characterized in that the focusing position of the photographing lens is set by the focus adjusting means based on an output of the light receiving means and an output of the transparency evaluating means when the water detecting means detects that the medium surrounding the camera is water.

(7) The camera capable of photographing in water described in the item (6), characterized by comprising an electronic flash device for exposure whose emission light amount is adjustable and characterized in that the light emission amount of the electronic flash device for exposure is set based on an output of the light receiving means and an output of the transparency evaluating means when the camera is used in the water.

(8) A distance measuring device characterized by comprising light projecting means for projecting distance measurement light towards an object; light receiving means for receiving reflected light from the object caused by the distance measurement light and outputting information of distance to the object; underwater detecting means for detecting that a medium between the object and the light projecting means and light receiving means is water; and transparency evaluating means for evaluating the light transmission rate of the water which is the above medium; and characterized in that the distance to the object is determined based on an output of the light receiving means and an output of the transparency evaluating means when the underwater detecting means has detected that the medium is water.

(9) The distance measuring device described in the item (8), characterized in that the distance to the object is determined irrespective of the output of the transparency evaluating means when distance information from the light receiving means indicates a distance shorter than a preset distance.

(10) A camera capable of photographing in water, characterized by comprising light projecting means for projecting light in the water; light receiving means for receiving only a light beam from a portion near the light emitting section of the light projecting means; and determining means for determining that the degree of transparency in the water is low when an output of the light receiving means generated at the time of light projection is higher than a preset level.

(11) A camera capable of photographing in water, characterized by comprising electronic flash means; use-of-electronic flash warning means; and water-transparency evaluating means; and characterized in that the use-of-electronic flash section warning means is activated to give warning display to the photographer when the transparency determining means has determined that the degree of transparency in the water is low.

(12) A camera capable of photographing in water, comprising distance measuring means for measuring a distance to an object; and focus adjusting means for determining a focusing distance according to an output of the distance measuring means; characterized by comprising suspended matter detecting means for detecting the density of suspended matters such as fog or smoke in the air; and regulating means for regulating the farthest point adjusted by the focus adjusting means based on an output of the suspended matter detecting means.

As described above, according to this invention, it is possible to provide a camera capable of photographing in water with which the precise auto-focusing can be attained not only in the air but also in the water and underwater photographs can be easily taken.

Additional embodiments of the present invention will be more apparent to those skilled in the art from consideration of the specification and practice of the present invention disclosed herein. It is intended that the specification and examples be considered as exemplary only, with the true scope of the present invention being indicated by the following claims.

What is claimed is:

1. An auto-focusing camera capable of photographing in water, comprising:
    underwater state detecting means for detecting or setting a condition in which a medium around the camera is water;
    focus detecting means for optically detecting data necessary for the focus adjustment of a photographing lens;
    transparency evaluating means for optically detecting the degree of transparency of a medium around the camera; and
    lens driving means for adjusting the focus of the photographing lens based on an output of said focus detecting means, output of said underwater state detecting means and output of said transparency evaluating means.

2. A camera according to claim 1, wherein said focus detecting means detects data necessary for the focus adjustment of the photographing lens by projecting a light beam towards a subject and receiving reflected light from the subject caused by the projected light.

3. A camera according to claim 1, wherein said focus detecting means detects data necessary for the focus adjustment of the photographing lens by receiving a light beam from a subject by use of a pair of photoelectric elements having parallax.

4. A camera according to claim 1, wherein said driving means compares data of said focus detecting means with a preset value when the medium surrounding the camera is water and effecting the focus adjustment of the photographing lens by referring to an output of said transparency evaluating means.

5. A camera according to claim 1, wherein said transparency evaluating means detects the degree of transparency of the medium surrounding the camera by projecting light towards the subject by use of light projecting means having an opening and detecting scattered light near the opening.

6. A camera according to claim 3, wherein the contrast condition of the subject is detected based on an output from said pair of photoelectric elements and the focus adjustment of the photograph lens is effected by referring to an output of said transparency evaluating means when the contrast condition does not reach a preset value.

7. A camera capable of photographing in water, comprising:
light projecting means for projecting light towards a subject;
a first light receiving element for receiving reflected light from the subject caused by the projected light;
underwater detecting means for determining whether the camera is used in the water or not;
transparency measuring means for measuring the degree of transparency of a photographing space; and
focus adjusting means for effecting the focus adjustment of a photographing lens according to outputs of said first light receiving element, underwater detecting means, and transparency measuring means.

8. A camera according to claim 7, wherein said light projecting means is a xenon discharge tube.

9. A camera according to claim 8, wherein said first light receiving element is a semiconductor position detecting element.

10. A camera according to claim 9, wherein said underwater detecting means receives light emitted from light emitting means at second light receiving means and determines whether the camera is used in the water or not according to an output of said light receiving means.

11. A camera according to claim 9, wherein said transparency measuring means receives, at a third light receiving element, light emitted from light emitting means and scattered from suspended matters distributed in the light projecting optical path.

12. A camera according to claim 10, wherein said underwater detecting means and transparency measuring means commonly use one light emitting element.

13. A camera capable of photographing in water, the camera comprising:
artificial illuminating means for illuminating a subject to compensate for insufficient exposure;
underwater detecting means for determining whether the camera is used in the water or not;
transparency measuring means for measuring a degree of transparency of a photographing space corresponding to a density of small suspended matter distributed in the photographing space; and
warning means for giving a warning to a photographer when it is determined that the degree of transparency is not higher than a preset level according to an output of said transparency measuring means.

14. A camera capable of photographing in water, the camera comprising:
artificial illuminating means for illuminating a subject to compensate for insufficient exposure;
underwater detecting means for determining whether the camera is used in the water or not;
transparency measuring means for measuring a degree of transparency of a photographing space corresponding to a density of small suspended matter distributed in the photographing space; and
artificial illumination inhibiting means for inhibiting the operation of said artificial illuminating means when it is determined that the degree of transparency is not higher than a preset level according to an output of said transparency measuring means.

15. A camera capable of photographing in water, the camera comprising:
artificial illuminating means for illuminating a subject to compensate for insufficient exposure;
underwater detecting means for determining whether the camera is used in the water or not;
transparency measuring means for measuring a degree of transparency of a photographing space corresponding to a density of small suspended matter distributed in the photographing space;
exposing operation inhibiting means for giving a warning to the photographer and inhibiting an exposing operation when it is determined that the degree of transparency is not higher than a preset level according to an output of said transparency measuring means; and
exposing operation permitting means for releasing the inhibition state of the exposing operation set by said exposing operation inhibiting means.

16. A camera capable of photographing in water, comprising:
artificial illuminating means for illuminating a subject to compensate for insufficient exposure;
underwater detecting means for determining whether the camera is used in the water or not;
transparency measuring means for measuring the decree of transparency corresponding to the density of small suspended matters distributed in a photographing space;
exposing operation inhibiting means for giving a warning to the photographer and inhibiting the exposing operation when it is determined that the degree of transparency is not higher than a preset level according to an output of said transparency measuring means; and
exposing operation permitting means for releasing the inhibition state of the exposing operation set by said exposing operation inhibiting means, said exposing operation inhibiting means issuing a warning and inhibiting the exposing operation when a shutter release button is operated.

17. A camera capable of photographing in water, comprising:
artificial illuminating means for illuminating a subject to compensate for insufficient exposure;
underwater detecting means for determining whether the camera is used in the water or not;
transparency measuring means for measuring the degree of transparency corresponding to the density of small suspended matters distributed in a photographing space;
exposing operation inhibiting means for giving a warning to the photographer and inhibiting the exposing operation when it is determined that the degree of transparency is not higher than a preset level according to an output of said transparency measuring means; and exposing operation permitting means for releasing the inhibition state of the exposing operation set by said exposing operation inhibiting means, said exposing operation inhibiting means issuing a warning and inhibiting the exposing operation when a shutter release button is operated, and said exposing operation permitting means releasing the exposing operation inhibiting state when the shutter button is operated again.

18. A camera capable of photographing in water, comprising:

a light emitting unit which illuminates a subject to be photographed at the time of exposure;

means for controlling said light emitting unit before exposure; and determining means for determining whether the camera is in the water or not according to a rate of a wavelength component of a reflected signal light from the subject, caused by the light emitting unit before exposure.

19. A camera capable of photographing in water, comprising:

light projecting means for projecting distance measuring light to an object;

light receiving means for receiving reflected light from the object caused by the distance measuring light and outputting information of distance to the object;

underwater detecting means for detecting that a medium between said light projecting means and said light receiving means is water;

transparency evaluating means for evaluating the light transmission rate of the water which is the above medium; and means for determining the distance to the object based on an output of said light receiving means and an output of said transparency evaluating means when said underwater detecting means has detected that the camera is in the water.

20. A camera according to claim 19, wherein said distance measuring means determines the distance to the object irrespective of the output of said transparency evaluating means when distance information from said light receiving means indicates a distance shorter than a preset distance.

21. A camera capable of photographing in water, comprising:

light projecting means for projecting light in the water;

light receiving means for receiving only a light beam from a portion near a light emitting portion of said light projecting means; and determining means for detecting an output of said light receiving means generated at a time of light projection by said light projecting means and determining that the degree of transparency of a water is low when the output of said light receiving means is higher than a preset level.

22. A camera capable of photographing in water, comprising:

electronic flash means;

use-of-electronic flash section warning means; and water-transparency evaluating means;

wherein said use-of-electronic flash warning means is activated to give warning display to the photographer when said transparency determining means has determined that the degree of transparency in the water is low.

23. A camera capable of photographing in water, comprising:

a pair of optical sensor arrays for receiving light from an object to be measured via spatially different optical paths;

distance measuring means for deriving a distance to the object based on the relative positional difference between received light intensity distributions of respective optical sensors of said optical sensor arrays;

underwater determining means for detecting that the camera lies in the water;

muddiness detecting means for evaluating the degree of muddiness of the water when the camera lies in the water; and means for determining the focusing position of a photographing lens based on outputs of said distance measuring means, underwater determining means and muddiness detecting means.

24. A camera according to claim 23, wherein said distance measuring means includes default detecting means; and means for setting the focal length of the photographing lens to correspond to a distance determined by an output of said muddiness detecting means when said default detecting means outputs a default signal.

25. A camera according to claim 23, further comprising:

auxiliary light source for projecting light when the distance to the object is measured;

optical sensor means contained in said muddiness detecting means, for receiving light from a portion near the light emitting portion of said auxiliary light source; and correction means for correcting an output of said distance measuring means according to an output of said optical sensor means generated at the time of light projection of said auxiliary light source.

26. A camera capable of photographing in water, comprising:

distance measuring means for measuring the distance to an object;

focus adjusting means for adjusting the focal length of a photographing lens according to an output of said distance measuring means;

muddiness detecting means for detecting the degree of muddiness of the water; and regulating means for regulating the farthest point adjusted by said focus adjusting means based on an output of said muddiness detecting means.

27. A camera capable of photographing in water, comprising:

focus adjusting means for driving a photographing lens to adjust the focal length thereof;

light projecting means having an electronic flash device as a light source, for projecting a light beam towards an object;

light receiving means for receiving a reflected light beam from the object caused by the light beam projected from said light projecting means and outputting information of distance to the object;

water detecting means for optically detecting that the surrounding medium is water;

transparency evaluating means for evaluating the degree of transparency of the medium when an output indicating that the medium is water is generated from said water detecting means; and control means for setting the focusing position of the photographing lens based on an output of said light receiving means and an output of said transparency evaluating means when an output indicating that the medium is water is generated from said water detecting means.

28. A camera capable of photographing in water, comprising:

focus adjusting means for driving a photographing lens to adjust the focal length thereof;

light projecting means having an electronic flash device as a light source, for projecting a light beam towards an object;

light receiving means for receiving a reflected light beam from the object caused by the light beam projected from said light projecting means and outputting information of distance to the object;

first photoelectric converting means arranged near said light receiving means, for receiving the reflected light beam from the object caused by the projected light beam via a visible light cut-off filter;

water detecting means for detecting that the medium surrounding the camera is water by comparing an output of said light receiving means with an output of said first photoelectric converting means;

second photoelectric converting means for receiving scattered light from a portion near the light emitting portion of said light projecting means; and control means for causing said focus adjusting means to set the focusing position of the photographing lens based on an output of said light receiving means and an output of said second photoelectric converting means when said water detecting means detects that the medium surrounding the camera is water.

29. A camera according to claim 27, which further comprises an electronic flash device for exposure whose light emission amount is adjustable; and in which said control means determines the light emission amount of said electronic flash device for exposure based on an output of said light receiving means and an output of said transparency evaluating means when the camera is used in the water.

30. A camera according to claim 28, which further comprises an electronic flash section device for exposure whose light emission amount is adjustable; and in which said control means determines the light emission amount of said electronic flash section device for exposure based on an output of said light receiving means and an output of said transparency evaluating means when the camera is used in the water.

31. A camera capable of photographing in water, comprising:

distance measuring means for measuring a distance to an object;

focus adjusting means for determining the focusing position of a photographing lens according to an output of said distance measuring means;

detecting means for detecting the density of suspended matters formed of small particles present in a photographing space; and regulating means for regulating the farthest point adjusted by said focus adjusting means based on an output of said detecting means.

32. A camera capable of photographing in water, comprising:

light receiving means for receiving reflected light from a subject;

photoelectric converting means arranged near the image forming position of said light receiving means;

calculating means for calculating a distance to the subject based on an output of said photoelectric converting means;

underwater determining means for optically determining that the camera lies in the water;

transparency evaluating means for evaluating the degree of muddiness of the surrounding water when the camera lies in the water; and focusing means for determining the focusing position of the photographing lens of the camera based on an output of said calculating means and an output of said transparency evaluating means when said underwater determining means has determined that the camera lies in the water.

33. A camera capable of photographing in water, comprising:

focus adjusting means for driving a photographing lens to adjust the focal length thereof;

light projecting means having an electronic flash device as a light source, for projecting a light beam towards an object;

light receiving means for receiving a reflected light beam from the object caused by the light beam projected from said light projecting means and outputting information of distance to the object;

water detecting means for detecting that a medium surrounding the camera is water;

transparency evaluating means for evaluating the degree of transparency of the medium when an output indicating that the medium is water is generated from said water detecting means; and control means for setting the focusing position of the photographing lens and controlling said focus adjusting means based on an output of said light receiving means and an output of said transparency evaluating meals when an output indicating that the medium is water is generated from said water detecting means.

34. A camera according to claim 32, wherein said transparency evaluating means evaluates the degree of muddiness of the surrounding water by detecting the light scattering condition in a portion near the light emission opening set when said light projecting means for projecting light in the low contrast state is operated.

* * * * *

UNITED STATES PATENT AND TRADEMARK OFFICE
CERTIFICATE OF CORRECTION

PATENT NO. : 5,826,113
DATED : October 20, 1998
INVENTOR(S) : Osamu NONAKA

It is certified that error appears in the above-identified patent and that said Letters Patent is hereby corrected as shown below:

On the Title Page, Item [56] References Cited, under "U.S. PATENT DOCUMENTS"

change "5,513,622  5/1996" to

--5,153,622  10/1992--.

Signed and Sealed this

Thirtieth Day of November, 1999

Attest:

Q. TODD DICKINSON

*Attesting Officer*  *Acting Commissioner of Patents and Trademarks*